(12) United States Patent
Holladay et al.

(10) Patent No.: US 11,380,043 B2
(45) Date of Patent: Jul. 5, 2022

(54) MODELING REGIONS OF INTEREST OF AN ANATOMIC STRUCTURE

(71) Applicant: CENTERLINE BIOMEDICAL, INC., Cleveland, OH (US)

(72) Inventors: Matthew Holladay, Cleveland, OH (US); Vikash Goel, Cleveland, OH (US); Robert Craig Hudson, Cleveland, OH (US)

(73) Assignee: CENTERLINE BIOMEDICAL, INC., Cleveland, OH (US)

( * ) Notice: Subject to any disclaimer, the term of this patent is extended or adjusted under 35 U.S.C. 154(b) by 0 days.

(21) Appl. No.: 16/839,949

(22) Filed: Apr. 3, 2020

(65) Prior Publication Data

US 2020/0320775 A1 Oct. 8, 2020

Related U.S. Application Data

(60) Provisional application No. 62/829,378, filed on Apr. 4, 2019.

(51) Int. Cl.
*G06T 15/08* (2011.01)
*G06T 7/11* (2017.01)
(Continued)

(52) U.S. Cl.
CPC ............ *G06T 15/08* (2013.01); *G06T 7/0012* (2013.01); *G06T 7/11* (2017.01); *G06T 17/10* (2013.01); *G06V 10/25* (2022.01)

(58) Field of Classification Search
CPC ....... G06K 9/3233; G06T 7/0012; G06T 7/10; G06T 7/11; G06T 15/08; G06T 17/10
See application file for complete search history.

(56) References Cited

U.S. PATENT DOCUMENTS 6,501,848 B1   12/2002   Carroll et al.
6,728,566 B1    4/2004   Subramanyan et al.
6,782,284 B1    8/2004   Subramanyan et al.
(Continued)

FOREIGN PATENT DOCUMENTS

EP      0954830 B1    3/2006
JP   2012217780 A    11/2012
(Continued)

OTHER PUBLICATIONS

Saur et al., "Automatic Detection of Calcified Coronary Plaques in Computed Tomography Data Sets", Springer-Verlag, Berlin, Heidelberg, 2008 (Year: 2008).*

(Continued)

*Primary Examiner* — Diane M Wills
(74) *Attorney, Agent, or Firm* — Tarolli, Sundheim, Covell & Tummino LLP (57) ABSTRACT

In an example, a method can include segmented image volume data for at least one anatomic structure, wherein the segmented image volume data includes a 3-D image volume that includes the at least one anatomic structure. The method can include searching outward from a computed centerline for the at least one anatomic structure to detect a surface of one or more regions of interest of the at least one anatomic structure by evaluating values associated with voxels representing the 3-D image volume that includes the at least one anatomic structure relative to a threshold. The method can further include isolating the one or more regions of interest of the at least one anatomic structure in response to the searching and generating a region of interest model based on the one or more isolated regions of interest.

23 Claims, 7 Drawing Sheets

(51) Int. Cl.
*G06T 17/10* (2006.01)
*G06T 7/00* (2017.01)
*G06V 10/25* (2022.01)

(56) References Cited

U.S. PATENT DOCUMENTS

| | | | |
|---|---|---|---|
| 7,149,333 | B2 | 12/2006 | Pieper et al. |
| 2003/0056799 | A1 | 3/2003 | Young et al. |
| 2005/0152588 | A1 | 7/2005 | Yoshida et al. |
| 2006/0036167 | A1 | 2/2006 | Shina |
| 2006/0251300 | A1 | 11/2006 | Borgert et al. |
| 2006/0280351 | A1 | 12/2006 | Luping et al. |
| 2007/0116342 | A1 | 5/2007 | Zarkh et al. |
| 2007/0248250 | A1* | 10/2007 | Gulsun .............. G06K 9/20 382/128 |
| 2007/0274579 | A1* | 11/2007 | Cai .................... G06T 19/00 382/131 |
| 2008/0018645 | A1 | 1/2008 | Dwyer et al. |
| 2008/0132774 | A1 | 6/2008 | Milstein et al. |
| 2009/0279758 | A1 | 11/2009 | Dikici et al. |
| 2010/0166283 | A1* | 7/2010 | Grosskopf .......... G06K 9/00 382/131 |
| 2011/0026793 | A1* | 2/2011 | Goel .................. G06T 17/30 382/131 |
| 2014/0355850 | A1* | 12/2014 | Kelm ................. G06T 7/0012 382/128 |
| 2016/0048955 | A1 | 2/2016 | Carmi |
| 2017/0049379 | A1 | 2/2017 | Luo et al. |
| 2017/0076467 | A1* | 3/2017 | Mistretta .......... G06T 7/2053 |
| 2018/0137656 | A1* | 5/2018 | Li .................... A61B 6/5235 |

FOREIGN PATENT DOCUMENTS

| | | | |
|---|---|---|---|
| WO | 2002/029717 | A3 | 4/2002 |
| WO | 2003/045244 | A2 | 6/2003 |
| WO | 2005/055496 | A2 | 6/2005 |
| WO | 2005118659 | A2 | 12/2005 |
| WO | 2007/005976 | A1 | 1/2007 |
| WO | 2007/033379 | A2 | 3/2007 |

OTHER PUBLICATIONS

Kramme et al., "Springer Handbook of Medical Technology", Springer Heidelberg Dordrecht, 2011 (Year: 2011).*

Applicant: Centerline Biomedical, Inc.; PCT International Patent Application No. PCT/US2020/026699; Filing Date: Apr. 3, 2020; PCT International Search Report and PCT Written Opinion; Authorized Officer: Kang Min Jeong; dated Jul. 24, 2020; 19 pgs.

Hernandez-Hoyos, Marcela, et al. "Computer-assisted analysis of three-dimensional MR angiograms." RadioGraphics 22.2 (2002): 421-436.

Park, Hyungjun, and Kwangsoo Kim. "Smooth surface approximation to serial cross-sections" Computer-Aided Design 28.12 (1996): 995-1005.

Goel, Vikash Ravi, Roy K. Greenberg, and Donald P. Greenberg. "Automated vascular geometric analysis of aortic aneurysms." IEEE computer graphics and applications 28.3 (2008): 76-86.

Goel, Vikash Ravi, Roy K. Greenberg, and Donald P. Greenberg. "Mathematical analysis of DICOM CT datasets: Can endograft sizing be automated for complex anatomy?." Journal of vascular surgery 47.6 (2008): 1306-1312.

Saito, Toyofumi, and Jun-Ichiro Toriwaki. "New algorithms for euclidean distance transformation of an n-dimensional digitized picture with applications." Pattern recognition 27.11 (1994): 1551-1565.

Jones, Mark W., J. Andreas Baerentzen, and Milos Sramek. "3D distance fields: A survey of techniques and applications." IEEE Transactions on visualization and Computer Graphics 12.4 (2006): 581-599.

Mourgues, Fabien, et al. "Interactive guidance by image overlay in robot assisted coronary artery bypass." International Conference on Medical Image Computing and Computer-Assisted Intervention. Springer, Berlin, Heidelberg, 2003.

Langs, Georg, et al. "Building and registering parameterized 3d models of vessel trees for visualization during intervention." Proceedings of the 17th International Conference on Pattern Recognition, 2004. ICPR 2004.. vol. 3. IEEE, 2004.

Pan, Mian, and Gisela Klette. A revision of a 3D skeletonization algorithm. CITR, The University of Auckland, New Zealand, 2004.

Siddiqi, Kaleem, et al. "Hamilton-jacobi skeletons." International Journal of Computer Vision 48.3 (2002): 215-231.

Weisstein, Eric W. "Derivative." (2002).

Wikipedia, the Free Encyclopedia, The Hounsfield scale; https://en.wikipedia.org/wiki/Hounsfield_scale; Aug. 14, 2020; 6 pgs.

Wikipedia, the Free Encyclopedia, Marching cubes; https://en.wikipedia.org/wiki/Marching_cubes; Aug. 14, 2020; 4 pgs.

* cited by examiner

FIG. 8 though this imaging data may be representative of the anatomy in three-dimensions, a computer can be used to generate or render a three-dimensional (3D) image. The 3D image can be rendered based on the imaging data received from an imaging device used to generate the imaging data.
MODELING REGIONS OF INTEREST OF AN ANATOMIC STRUCTURE

CROSS-REFERENCE TO RELATED APPLICATION

This application claims the benefit of U.S. Provisional Patent Application No. 62/829,378 filed Apr. 4, 2019, and entitled MODELING REGION OF INTEREST OF AN ANATOMIC STRUCTURE, which is incorporated herein by reference in its entirety.

TECHNICAL FIELD

This disclosure relates to modeling one or more regions of interest of an anatomic structure.

BACKGROUND

Human anatomy can be digitally visualized using a variety of imaging techniques. Magnetic resonance imaging (MRI), computed tomography (CT), and positron emission tomography (PET) are just some examples of imaging techniques used to image anatomic structures of a patient. Since this imaging data may be representative of the anatomy in three-dimensions, a computer can be used to generate or render a three-dimensional (3D) image. The 3D image can be rendered based on the imaging data received from an imaging device used to generate the imaging data.

SUMMARY

This disclosure relates to modeling one or more regions of interest of an anatomic structure.

In an example, a system can include a non-transitory computer-readable medium that can be configured to store data and instructions and a processor that can be configured to access the non-transitory computer-readable medium and execute the instructions. The instructions can include a region of interest method code and a region of interest model code. The region of interest method code can be programmed to receive segmented image volume data for at least one anatomic structure. The segmented image volume data can include a three-dimensional (3-D) image volume that can include the at least one anatomic structure. The region of interest method code can be further programmed to search outward from a computed centerline for the at least one anatomic structure to detect a surface of one or more regions of interest of the at least one anatomic structure by evaluating values associated with voxels or pixels representing the 3-D image volume that can include the at least one anatomic structure relative to a threshold. The region of interest method code can be programmed to generate a region of interest model based on the one or more identified regions of interest.

In another example, a computer-implemented method can include receiving segmented image volume data for at least one anatomic structure. The segmented image volume data can include a 3-D image volume that includes the at least one anatomic structure. The computer-implemented method can include searching outward from a computed centerline for the at least one anatomic structure to detect a surface of one or more regions of interest of the at least one anatomic structure by evaluating values associated with voxels or pixels representing the 3-D image volume that includes the at least one anatomic structure relative to a threshold. The computer-implemented method can further include isolating the one or more regions of interest of the at least one anatomic structure in response to the searching and generating a region of interest model based on the one or more isolated regions of interest.

In an even further example, a system can include a non-transitory computer-readable medium that can be configured to store data that can include segmented image volume data for at least one anatomic structure and instructions. The segmented image volume data can include a 3-D image volume that can include the at least one anatomic structure. The system can further include a processor that can be configured to access the non-transitory computer-readable medium and execute the instructions. The instructions can include a region of interest modeling engine. The region of interest modeling engine can be programmed to searching outward from a computed centerline for the at least one anatomic structure to detect a surface of one or more regions of interest of the at least one anatomic structure by evaluating Hounsfield unit (HU) values associated with voxels representing the 3-D image volume that includes the at least one anatomic structure relative to a HU threshold. The region of interest modeling engine can be further programmed to isolate the one or more regions of interest of the at least one anatomic structure in response to the searching by excluding 3-D image volumes for the identified one or more regions of interest from the segmented image volume data for the at least one anatomic structure. The region of interest modeling engine can be further programmed to generate a region of interest model by applying a marching cubes algorithm to a voxel dataset for the isolated one or more regions of interest of the at least one anatomic structure.

DETAILED DESCRIPTION

This disclosure relates to modeling one or more regions of interest of an anatomic structure. In some examples, a region of interest modeling engine (e.g., software code executable by a processor) can be programmed to generate a region of interest model. The region of interest model can characterize (e.g., identify) abnormal or otherwise distinguishable areas of the anatomic structure, such as calcified, mineralized and plaque regions of a patient's vasculature. The region of interest model can be employed in a medical setting to help plan a corresponding procedure (e.g., surgical procedure). In some examples, the region of interest model can be displayed relative to an anatomic model characterizing the anatomic structure, such as during the corresponding procedure (e.g., on an output device). The region of interest model can be overlaid relative to the anatomic structure to facilitate intraoperative positioning and guidance of an object relative to the patient. Thus, by providing the region of interest model, for example, of calcified regions of the anatomic structure can allow for effective procedure planning and navigation during the procedure. In some examples, the region of interest model may be utilized to facilitate registration of images acquired according to different imaging modalities.

By way of example, to generate the region of interest model, the region of interest modeling engine can be programmed to receive image volume data that can include one or more three-dimensional (3-D) medical image volumes that can be acquired preoperatively for a given patient by a corresponding imaging modality. The image volume data can include image data representing voxels (e.g., 3-D image elements) corresponding to a patient anatomy. In some examples, values can be provided in Hounsfield units (HU) and associated with respective voxels in the image data. The region of interest modeling engine can be programmed to segment the image volume data to isolate the anatomic structure and one or more bones and/or other anatomic structures (e.g., organs). The region of interest modeling engine can be programmed to generate a centerline model that can characterize a geometry of the anatomic structure (e.g., each branch of the vessel) and a surface model for the anatomic structure (e.g., vessel structure) based on the segmented image volume data.

The region of interest modeling engine can be programmed to search (e.g., radially) outward from the centerline model to detect a surface characterized by the surface model of the one or more regions of interest of the anatomic structure. The searching can include evaluating HU values associated with voxels representing the 3-D image volume that includes the at least one anatomic structure relative to a HU threshold. The region of interest modeling engine can be programmed to isolate the one or more regions of interest of the at least one anatomic structure in response to the searching. For example, the region of interest modeling engine can be programmed to exclude 3-D image volumes for the identified one or more regions of interest from the segmented image volume data for the at least one anatomic structure. The region of interest modeling engine can be programmed to generate the region of interest model based on the one or more identified regions of interest. In some examples, the region of interest modeling engine can be programmed to generate the region of interest model by applying a marching cubes algorithm to a voxel dataset for the isolated one or more regions of interest of the at least one anatomic structure. The region of interest model can provide a graphical rendering (e.g., representation) of the one or more regions of interests. The one or more regions of interest can include a calcified region, a mineralized region, a plaque region, or a stent region.

Figure 1:
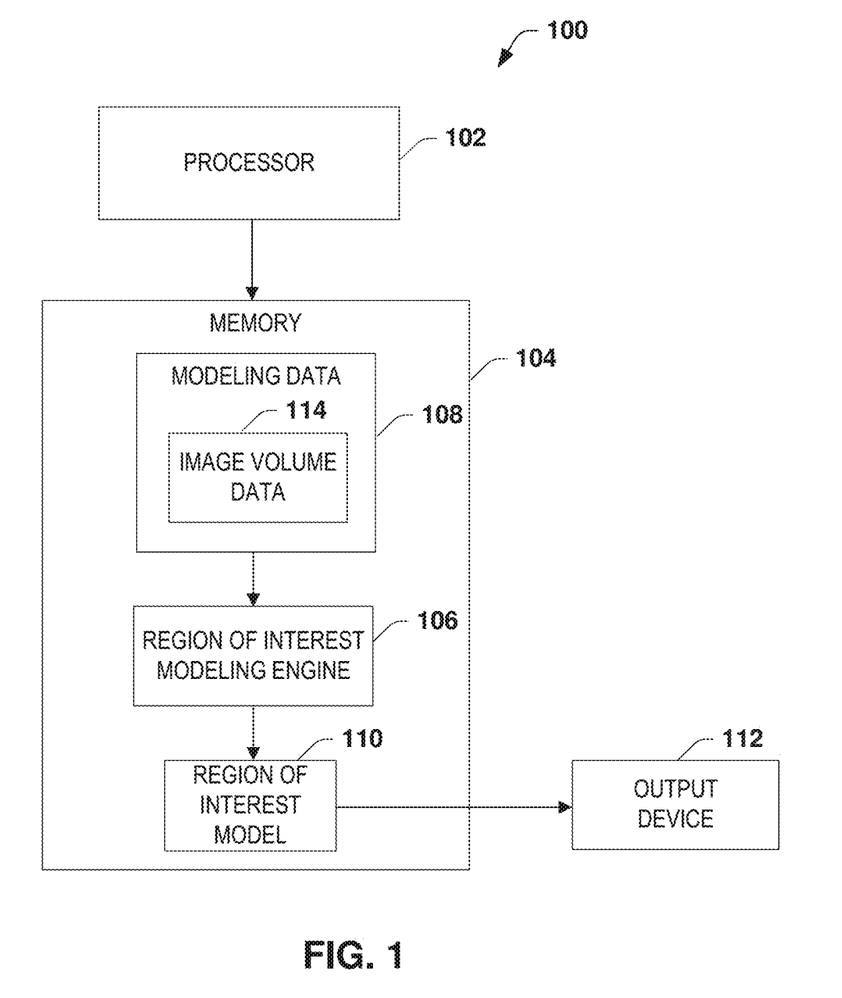
FIG. 1 is an example of a system that can be implemented to model one or more regions of interest of anatomic structure.

FIG. 1 depicts an example of a system 100 that can be implemented to model one or more regions of interest of an anatomic structure. The system 100 can be implemented in a standalone computer, a workstation, an application specific machine, or in a network environment in which one or more of the modules or data can reside locally or remotely relative to where a user interacts with the system 100. The system 100 can include a processor 102. The processor 102 can be configured to access a memory 104 and execute machine-readable instructions stored in the memory 104 to implement one or functions, such as modeling of the one or more regions of interest of the anatomic structure. The machine-readable instructions can include a region of interest modeling engine 106.

The region of interest modeling engine 106 can be programmed to receive modeling data 108 and process the modeling data 108 to model (e.g., generate) a region of interest model 110 to provide a graphical rendering (e.g., characterization) of the one or more regions of interest of the anatomic structure. In some examples, each region of interest can be modeled separately by the region of interest modeling engine 106 to provide one or more region of interest models 110. In other examples, the region of interest modeling engine 106 can be programmed to provide an integrated region of interest model 110 to provide a compressive model of the one or more regions of interest. In some examples, a user interface (not shown in FIG. 1) can be provided to allow a user to provide a user input for initiating the modeling process of the region of interest modeling engine 106.

The user interface can also be utilized to set and establish data paths and variables employed by the region of interest modeling engine 106. By way of further example, the user interface can also be utilized to configure the computations performed by the region of interest modeling engine 106 and/or one or more output devices 112 that can be provided. For instance, the user interface can configure the types of methods and parameters utilized in forming the analysis and processing (e.g., modeling) based on the modeling data 108. In some examples, the processor 102 can be programmed to provide the region of interest model 110 to the output device 112 to provide a visualization of the one or more regions of interest. The rendered visualization of the region of interest model 110 may be used to facilitate or assist a medical procedure control delivery of a therapy.

By way of example, to model the one or more regions of interest, the region of interest modeling engine 106 can be programmed to retrieve image volume data 114. The image volume data 114 can include one or more 3-D medical image volumes that can be acquired preoperatively or intraoperatively for a given patient by a corresponding imaging modality. For example, the image volume data 114 can correspond to a preoperative anatomic (e.g., arterial) computed tomography (CT) scan for a region of the patient. The image volume data 114 can include image data representing voxels (e.g., 3-D image elements) corresponding to a patient anatomy. In some examples, values can be provided in HU and associated with respective voxels in the image data. Each HU value associated with a corresponding voxel is proportional to a degree of x-ray attenuation by a material (e.g., tissue). Thus, each HU can represent a tissue density. The region of interest modeling engine 106 can be programmed to detect a surface of the one or more regions of interest of an anatomic structure of the patient based on HU values associated with the voxels, as described herein. The detected surface for each region of interest can be analyzed by the region of interest modeling engine 106 to determine the density of each region of interest.

The region of interest modeling engine 106 can be programmed to segment the image volume data 114 to isolate the anatomic structure and one or more bones and/or other anatomic structures (e.g., organs). In some examples, the anatomic structure being isolated can correspond to soft connective tissue, such as a major blood vessel as well as one or more branches that can extend from such vessel.

Thus, the region of interest modeling engine 106 can be programmed to isolate the tissue from the image volume data 114 to provide segmented image volume data.

In some examples, the region of interest modeling engine 106 can be programmed to generate a centerline model that can characterize a geometry of the anatomic structure (e.g., each branch of the vessel) and a surface model for the anatomic structure (e.g., vessel structure) based on the segmented image volume data. The surface model can describe a geometry for an interior as well as an exterior surface of the anatomic structure. The region of interest modeling engine 106 can be programmed to extract the centerline model as a pixel or voxel thickness extending longitudinally along a central axis of the anatomic structure. In some examples, the surface model can characterize (e.g., provide) a point cloud representation (e.g., x, y, z) to describe a shape of the anatomic structure (or a portion thereof) based on the segmented image volume data. Each point in the point cloud can have a corresponding intensity, density (e.g., HU value), location and/or direction. The region of interest modeling engine 106 can be programmed to transform surface point cloud data based on a mesh algorithm, such as a marching cube algorithm, to provide a 3-D image of the surface of the anatomic structure.

The region of interest modeling engine 106 can be programmed to search (e.g., radially) outward from the centerline model to detect a surface of the one or more regions of interest of the anatomic structure. In some examples, the region of interest modeling engine 106 can be programmed to initially evaluate the anatomic structure to determine a thickness of the anatomic structure. The region of interest modeling engine 106 can be programmed to identify one or more portions of the anatomic structure that may have a thickness that is equal to or greater than a thickness threshold (e.g., value or range). The region of interest modeling engine 106 can be programmed to flag the one or more portions for further evaluation, such as a more detailed analysis (e.g., granular evaluation) of the one or more portions for the one or more regions of interest.

In some examples, the region of interest modeling engine 106 can be programmed to find each edge corresponding to the surface of the one or more regions of interest. For example, the region of interest modeling engine 106 is programmed to compute a gradient vector for each voxel (or pixel) based on the segmented image volume data. The region of interest modeling engine 106 can be programmed to evaluate each computed gradient vector to identify a transition between each surface of the anatomic structure and the one or more regions of interest based on a gradient threshold (e.g., value or range of values). The region of interest modeling engine 106 can be programmed to identify the transition by determining if a difference between computed gradient vectors (e.g., computed gradient magnitudes) is greater than or equal to the gradient threshold.

In some examples, the region of interest modeling engine 106 is programmed to evaluate the one or more portions to identify the one or more regions of interest, in some examples, based on the thickness threshold. The one or more regions of interest can have a different type of material (e.g., density) than other surrounding regions of the anatomic structure. For example, the region of interest modeling engine 106 is programmed to detect the surface of the one or more regions of interest based on HU values associated with voxels representing the segmented image volume data for the anatomic structure. As such, the voxels representing the segmented image volume data for the abnormal portion of the anatomic structure can have a different HU value than expected for the one or more normal portions of the anatomic structure. The region of interest modeling engine 106 can be programmed to compare each HU value to a HU threshold to identify voxels (or pixels) that represent the one or more regions of interest (e.g., identify the one or more abnormal or other distinguishable portions of the anatomic structure). In some examples, the HU threshold can be set based on a type of imaging modality used to provide the image volume data 114.

The region of interest modeling engine 106 can be programmed to isolate the one or more identified regions of interest from the anatomic structure. For example, the region of interest modeling engine 106 can extract voxels representing an image volume of the one or more isolated regions of interest from the segmented image volume data for the anatomic structure, which extracted voxels can be stored in the memory 104 and tagged as corresponding to the region of interest based on the evaluation thereof. The region of interest modeling engine 106 can be programmed to generate the region of interest model 110 based on the removed voxels representing the image volume of the one or more isolated regions of interest. For example, the one or more regions of interest can correspond to a calcified region, a mineralized region, a plaque region, or a stent region. In some examples, the region of interest modeling engine 106 can be programmed to generate the region of interest model 110 to enable an overlay (e.g., over an anatomic model) of the one or more isolated regions of interest or a portion of the one or more isolated regions of interest in response to a user input via the user interface.

In some examples, the region of interest modeling engine 106 is programmed to generate the region of interest model 110 as a 3-D model of points (e.g., pixels or voxels) corresponding to the one or more isolated regions of interest. For example, the region of interest modeling engine 106 is programmed to provide a point cloud representation of the anatomic structure and correspondingly the one or more isolated regions and identify transitions (e.g., a boundary) between the one or more regions of interest and other regions of the anatomic structure based on HU values associated with cloud points representing the anatomic structure.

Accordingly, the region of interest modeling engine 106 can be programmed to generate the region of interest model 110 that can characterize (e.g., identify) abnormal areas of the anatomic structure, such as calcified, mineralized and plaque regions. The region of interest model 110 can be used to help plan a corresponding procedure (e.g., surgical procedure). In some examples, the region of interest model 110 can be displayed relative to an anatomic model characterizing the anatomic structure, during the corresponding procedure (e.g., on the output device 112), for example, while using a tracking system to facilitate intraoperative positioning and guidance of an object relative to the patient. In some examples, the tracking system can correspond to a tracking system as described in U.S. patent application Ser. No. 14/209,300 (hereinafter, "the '300 patent application"), entitled "Method and System to Facilitate Intraoperative Positioning and Guidance," which is hereby incorporated by reference in its entirety. In other examples, a different tracking system can be used.

Figure 2:
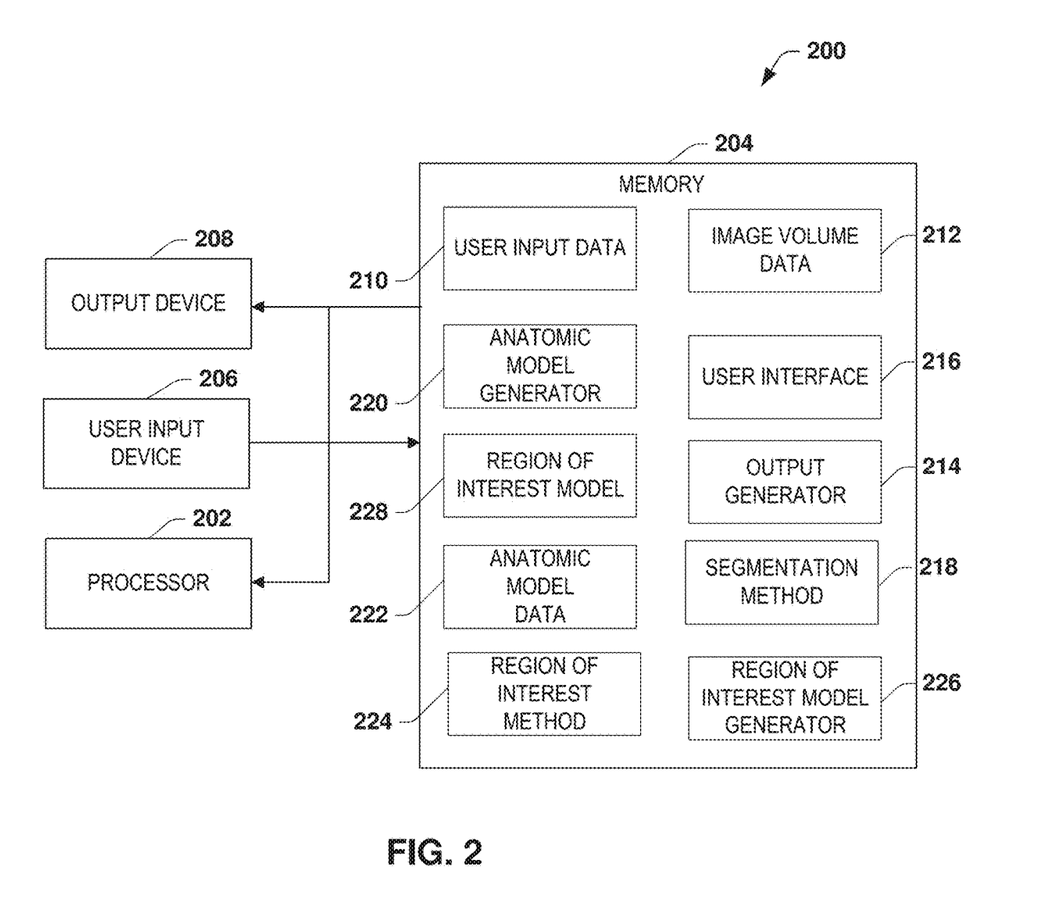
FIG. 2 is an example of a computer system programmed to provide a model of one or more regions of interest of an anatomic structure.

FIG. 2 is an example of a computer system 200 programmed to provide a model 228 of one or more regions of interest of an anatomic structure. In some examples, the model 228 corresponds to the region of interest model 110, as illustrated in FIG. 1. The computer system 200 can include one or more processors 202 and a memory 204. The memory 204 can include one or more non-transitory computer-readable media having instructions and data stored thereon. The memory 204 can include local storage with respect to the computer system 200 (e.g., physically attached to or in the same case as the processor 202) and/or it may be remote (e.g., network storage or in a cloud computing infrastructure). The computer system 200 also can include one or more input/output (I/O) devices, such as a user input device 206 and an output device 208. For example, the user input device 206 can include a keyboard, mouse, touch screen interface, gesture interface or the like that can be configured to provide instructions and commands that can be stored in the memory 204 as user input data 210. The output device 208 can include one or more displays, such as a monitor, heads up display or virtual or augmented reality headset or goggles. In some examples, the user input device 206 and the output device 208 can be integrated (e.g., a touch screen or other display) to provide both inputs and outputs for the computer system 200.

As an example, the user input device 206 can provide the user input data 210 to specify a position (e.g., spatial coordinates) and/or movement of a pointer (e.g., a cursor) with respect to a graphical representation of image volume data 212 that can be displayed on the output device 208. Additionally or alternatively, the user input device 206 can be configured to provide the user input data 210 to select a particular voxel or pixel that is being displayed as part of the image on the output device 208. As another example, the user input device 206 may be used to activate a function presented at a given location (e.g., an area of the display 208), such as functions described herein.

In some examples, the memory 204 can include image volume data 212 (e.g., as a Digital Imaging and Communications in Medicine (DICOM) or other type of file). The image volume data 212 can correspond to the image volume data 114, as illustrated in FIG. 1. The image volume data 212 can include one or more 3-D medical image volumes that can be acquired preoperatively for a given patient by a corresponding imaging modality. In some examples, the 3-D medical images volumes can be acquired intraoperatively. As an example, the image volume data 212 can correspond to a preoperative anatomic (e.g., arterial) CT scan for a region of the patient. In some examples, the CT scan can be acquired the same day as or even days, weeks or months prior to a corresponding procedure (e.g., surgical intervention). Other medical imaging modalities can be used to provide the image volume data 212, such as magnetic resonance imaging (MRI), ultrasonography, positron emission tomography (PET) or the like. Such scans can be common part of preoperative planning in a surgical workflow to help make diagnoses, plan surgery, or facilitate other interventions. The image volume data 212 can include image data representing voxels (3-D image elements) corresponding to patient anatomy. In some examples, values may be provided in HU and associated with respective voxels in the image data. In a CT scan, HU is proportional to a degree of x-ray attenuation by a material. As such, HU values can be used to assess tissue density. The HU values associated with the voxels can be used to detect a surface of one or more regions of interest of an anatomic structure of the patient, as disclosed herein.

Figure 7:
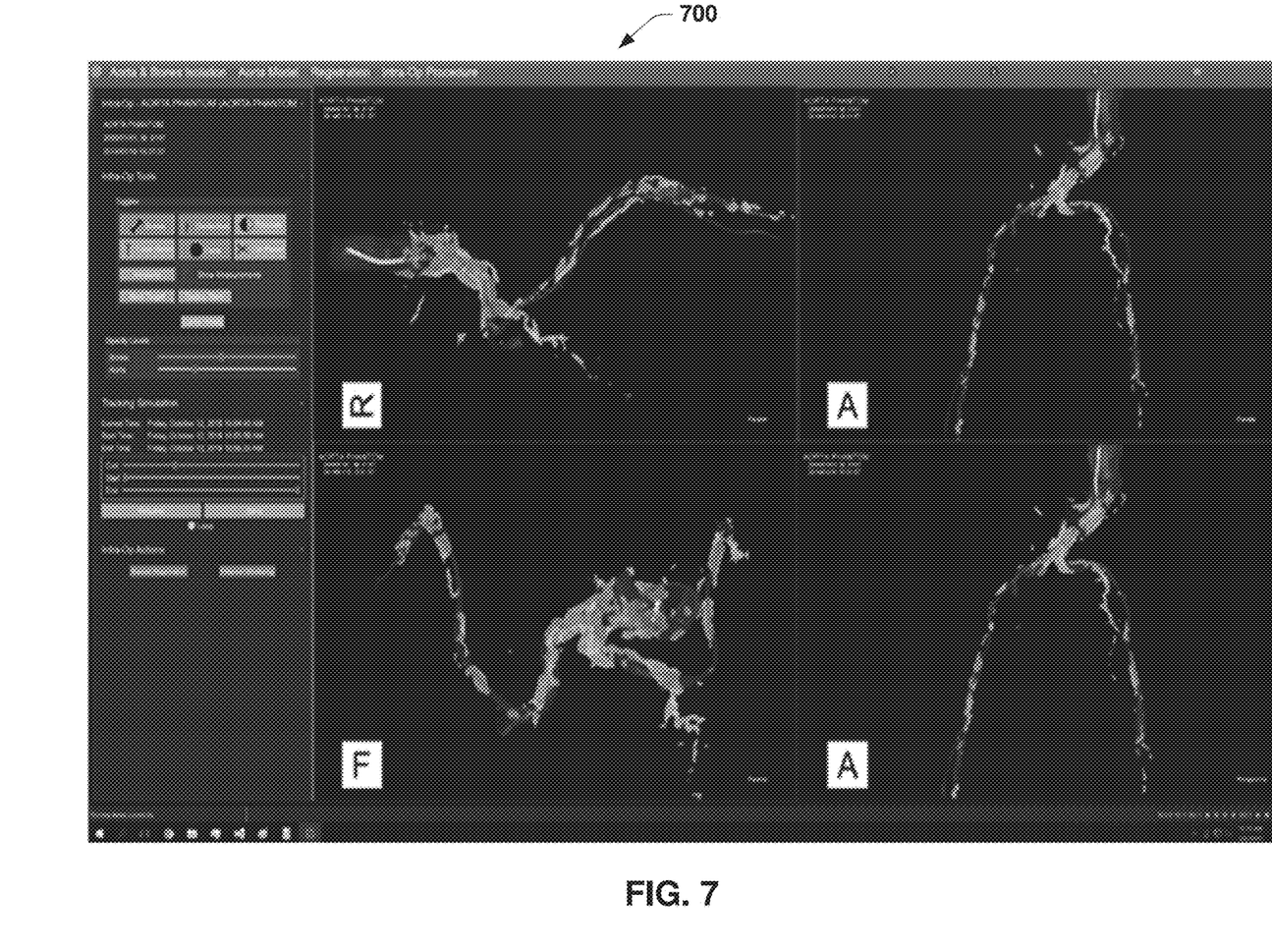
FIG. 7 depicts an example of a graphical user interface demonstrating a calcification model overlaying an anatomic model.
Figure 8:
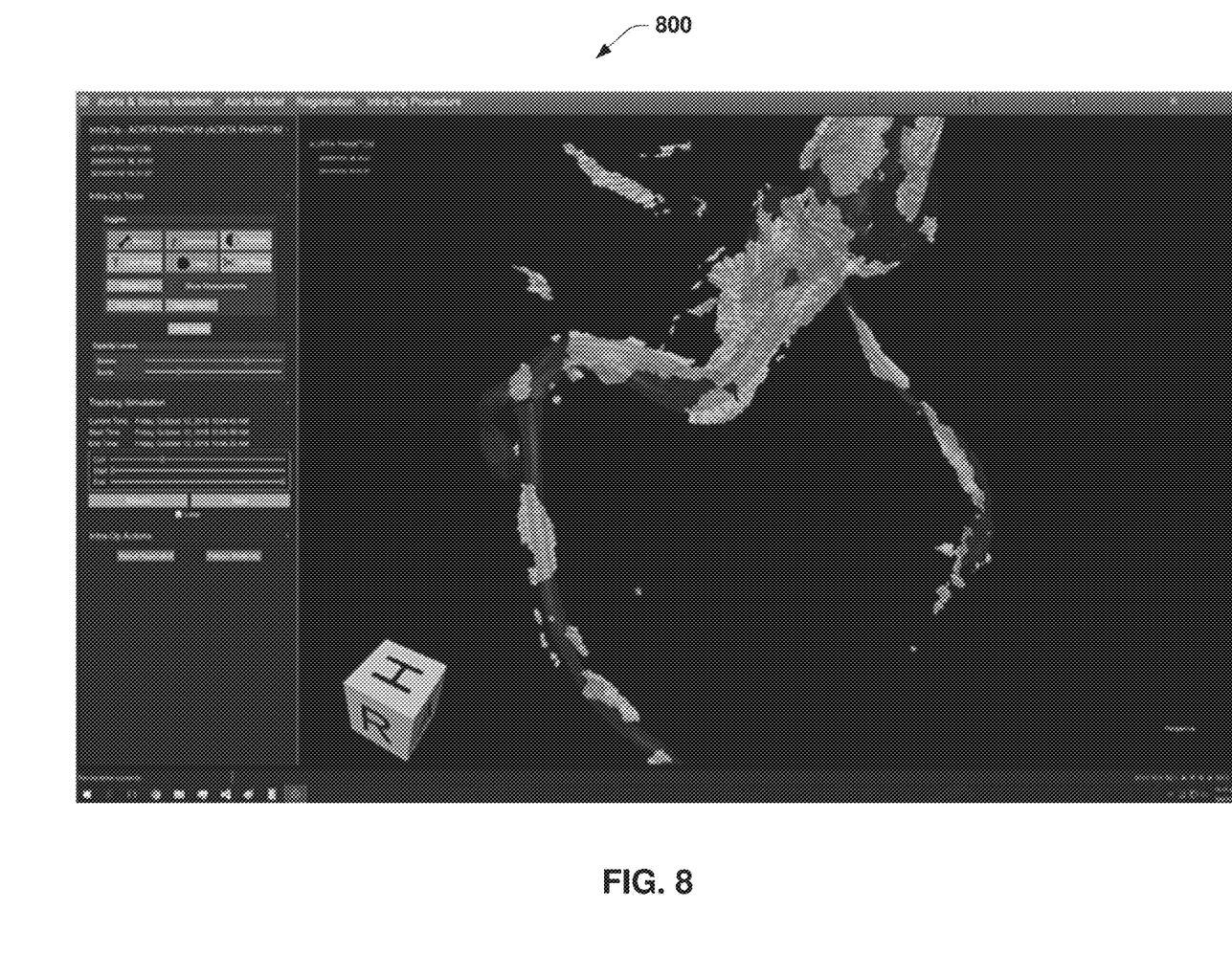
FIG. 8 depicts an example of another graphical user interface demonstrating a calcification model overlaying an anatomic model.

As mentioned, the memory 204 includes instructions that can be executed by the processor 202 to perform various functions disclosed herein. In the example of FIG. 2, the instructions can include an output generator 214 that can be programmed to generate an interactive output visualization that can be rendered based on the image volume data 212 as a graphical output and displayed on the output device 208. The output generator 214 can include one or more rendering methods and/or controls to control how the image is viewed (e.g., size, graphical overlaying, viewing angle, and the like) in the output visualization that is displayed by the output device 208. The instructions stored in memory 204 can also include a user interface 216 to enable user interaction (e.g., through the user input device 206) with the image and graphical user interfaces (GUIs) (e.g., as illustrated in FIGS. 7-8) being displayed as well as various functions, including a segmentation method 218. In some examples, the segmentation method 218 can form part of the region of interest modeling engine 106, as illustrated in FIG. 1.

The segmentation method 218 can be programmed to segment the image volume data 214, such as to isolate an anatomic structure (e.g., one or blood vessels). In other examples, the segmentation method 218 can further be programmed to segment the image volume data 212 to isolate one or more bones and/or other anatomic structures (e.g., organs). In some examples, the segmentation method 218 can include a segmentation method as described in U.S. patent application Ser. No. 16/265,732 (hereinafter, "the '732 patent application"), entitled "Segmentation of Anatomic Structures," which is hereby incorporated by reference in its entirety. In other examples, different segmentation methodologies can be used.

As an example, the segmentation method 218 can be programmed to isolate tissue from the image volume data 212, such as corresponding to the anatomic structure. The segmentation method 218 can provide segmented image volume data for the anatomic structure, as disclosed herein. In some examples, the anatomic structure being isolated can correspond to soft connective tissue, such as a major blood vessel as well as one or more branches that may extend from such vessel. As one example, the vessel can correspond to a patient's descending aorta and associated renal arteries as well as other branches thereof. In other examples, the anatomic structure can correspond to an intestinal tract, a portion of a respiratory tract, the patient's digestive tract or other anatomic structures (e.g., a kidney) that can be monitored or operated on for a variety of diagnostic and surgical purposes.

The system 200 can include an anatomic model generator 220 that can be programmed to generate an anatomic model representative as anatomic model data 222 based on the segmented image volume data for the anatomic structure. In some examples, the anatomic model generator 220 can correspond to an anatomic model generator, as described in '732 patent application. The anatomic model data 222 can include a centerline model that can describe a geometry of the anatomic structure (e.g., each branch of the vessel) and a surface model for the anatomic structure (e.g., vessel structure). The surface model can describe a geometry for an interior as well as an exterior surface of the anatomic structure (e.g., inner and outer vessel walls). Thus, in some examples, the anatomic model generator 220 can form part of the region of interest modeling engine 106, as illustrated in FIG. 1.

The anatomic model generator 220 can be programmed to compute a corresponding centerline for the anatomic structure based on the segmented image volume data for the anatomic structure (e.g., vessel, such as the aorta). As one example, the centerline can be extracted from the segmented image volume data as a pixel or voxel thickness extending longitudinally along a central axis of the anatomic structure. In one example, the centerline may be extracted according to the approach disclosed in U.S. Patent Publication No.

2011/0026793 entitled Automated Centerline Extraction Method and Generation of Corresponding Analytical Expression and Use Thereof, which is incorporated herein by reference. Other methods may be used to identify and model the centerline in other examples.

A corresponding surface boundary of the anatomic structure can be computed by the anatomic model generator 220. A surface of the anatomic structure can have a corresponding functional relationship relative to the centerline along a length of the anatomic structure as computed by the anatomic model generator 220. The anatomic model generator 220 can be programmed to provide the centerline model by computing model parameters from the segmented image volume data describing a geometry of the centerline, and further can be programmed to provide the surface model by computing model parameters from the segmented vessel image volume describing the surface of the anatomic structure.

In some examples, the anatomic model generator 220 can be programmed to provide a point cloud representation (e.g., x, y, z) to describe a shape of the anatomic structure (or a portion thereof) based on the segmented image volume data. Each point in the point cloud can have a corresponding intensity, density (e.g., HU value), location and/or direction. The anatomic model generator 220 can be programmed to transform surface point cloud data based on a mesh algorithm, such as a marching cube algorithm, to provide a 3-D image of the surface of the anatomic structure. Other similar mesh algorithms can be used as well.

By way of further example, the memory 204 employs a region of interest method 224. In some examples, the region of interest modeling engine 106, as illustrated in FIG. 1 can be programmed to implement the region of interest method 224. The region of interest method 224 can be programmed to search (e.g., radially) outward from the centerline to detect a surface of one or more regions of interest of the anatomic structure (e.g., based on evaluation of image data according to one or more search criteria). In some examples, the region of interest method 224 can be programmed search until an area of interest is identified. For example, the region of interest method 224 can be programmed to initially evaluate the anatomic structure to determine a thickness of the anatomic structure. The region of interest method 224 can be programmed to identify one or more portions of the anatomic structure that may have a thickness that is greater than some thickness threshold (e.g., value or range of values). The region of interest method 224 can be programmed to flag the one or more portions for further evaluation, such as a more detailed analysis (e.g., granular evaluation) of the one or more portions for the one or more regions of interest.

Additionally, or alternatively, the user input device 206 can be configured to provide the user input data 210 in response to a user to flag (or tag) of particular voxels (or pixels) being displayed as part of the image for the anatomic structure on the output device 208 that can correspond to the one or more portions based on user experience (e.g., knowledge of the user). The region of interest method 224 can be programmed to evaluate the one or more portions as described herein to identify the one or more regions of interest. The one or more regions of interest can have a different type of material (e.g., density) than other surrounding regions of the anatomic structure. In some examples, the region of interest method 224 can be programmed to identify the one or more regions of interest by evaluating speckle noise present in the image volume data 212.

As a further example, the region of interest method 224 is programmed to determine speckle noise characteristics of each of the anatomic structure, the one or more regions of interest, and, in some examples, blood flowing through the anatomic structure. The region of interest method 224 can be programmed to evaluate the speckle noise characteristics to identify a transition of the anatomic structure between any spatially adjacent regions. For example, the region of interest method 224 can be programmed to evaluate a speckle noise value associated with each voxel (or pixel) of the image volume data 212 relative to neighboring values to identify the transition. The transition can correspond to the surface (e.g., a boundary) of the one or more regions of interest.

In some examples, machine learning techniques can be employed to detect the surface of the one or more regions. For example, the region of interest method 224 can be programmed to employ an image classifier that has been trained based on image training data. The image classifier can be programmed to identify changes (e.g., transitions) between neighboring voxels (or pixel) in the image volume data 212. Example image classifiers (e.g., classification algorithms) can include decision tree classifiers, Naïve Bayes classifiers, artificial neural network classifiers (e.g., a convolutional neural network), and k-Nearest Neighbor classifiers. In other examples, a different image classifier can be employed. The image classifier can be programmed to receive the image volume data 212 and classify each object (e.g., the one or more regions, the anatomic structure, bone, organs, etc.) to identify the one or more regions of interest. In some examples, the region of interest method 224 can be programmed to tag each voxel (e.g., pixel) of the image volume data 212 (e.g., classified by classifier code) and to group (e.g., transformed by transform code) into respective classes. For example, a given class can include voxels (or pixels) from the image volume data 212 corresponding to (e.g., defining) the surface of the one or more regions of interest (e.g., plaque). Each class of tagged voxels (or pixels) can characterize a corresponding object in the image volume data 212. The region of interest method 224 can be programmed evaluate the voxels (or pixels) of each class relative to each other to identify the transition of the anatomic structure to the one or more regions corresponding to the surface of the one or more regions of interest.

In some examples, the region of interest method 224 can be programmed to detect the surface of the one or more regions of interest based on HU values associated with voxels representing the segmented image volume data for the anatomic structure. In some examples, the one or more regions of interest of the anatomic structure can correspond to an abnormal portion (e.g., an abnormal tissue area) of the anatomic structure that may have a particular HU (or HU range) that can be different from an expected HU for one or more normal portions (e.g., healthy tissue areas) of the anatomic structure. Thus, in some examples, the one or more regions of interest can correspond to a calcified region, a mineralized region, a plaque region, or a stent region. The abnormal portion can have a different density than the surrounding regions of the anatomic structure. As such, the voxels representing the segmented image volume data for the abnormal portion of the anatomic structure can have a different HU value than expected for the one or more normal portions of the anatomic structure.

The region of interest method 224 can be programmed to compare each HU value a to a HU threshold to identify voxels (or pixels) that represent the one or more regions of interest (e.g., identify the one or more abnormal portions of the anatomic structure). The HU threshold can correspond to one of a HU threshold value (e.g., a value of 130) or a HU threshold range (e.g., a range of 130 to 400). In some examples, the HU threshold can be user definable based on the user input data 210 provided at the user input device 206. In an example, the HU threshold can be set based on a given HU value associated with blood that has been mixed with a contrasting agent administered to the patient (e.g., prior to imaging). In some examples, a plurality of HU threshold ranges can be associated with a plurality of densities of different materials. The region of interest method 224 can be programmed to detect the surface of the one or more regions of the anatomic structure based on the plurality of HU threshold ranges. As an example, the region of interest method 224 can be programmed to identity a stent disposed within the anatomic structure (e.g., aorta) based on a density of the material of the stent.

In further examples, the region of interest method 224 can be programmed to evaluate HU values associated with voxels representing the segmented image volume data for the anatomic structure relative to the plurality of HU thresholds. The region of interest method 224 can be programmed to identify voxels based on the evaluation representing a stent in the segmented image volume data. Accordingly, the region of interest method 224 can be programmed to detect the surface of the one or more regions of interest of the anatomic structure based on one or more HU thresholds that have been associated with materials having different densities. The HU values and/or other density parameters that may be determined from the evaluation can be stored (e.g., as density metadata) in the memory 204. This HU and/or density parameters can be assigned to individual voxels or to a set of voxels, such as depending on the granularity of the evaluation.

By way of further example, the region of interest method 224 can be programmed to isolate the one or more identified regions of interest from the anatomic structure. For example, the region of interest method 224 can be programmed to extract voxels representing an image volume of the one or more isolated regions of interest from the segmented image volume data for the anatomic structure, which extracted voxels can be stored in the memory 104 and tagged as corresponding to the region of interest based on the evaluation thereof.

The memory 204 can include a region of interest model generator 226. In some examples, the region of interest model generator 226 can form part of the region of interest modeling engine 106, as illustrated in FIG. 1. The region of interest model generator 226 can be programmed to generate a region of interest model 228 based on the removed voxels representing the image volume of the one or more isolated regions of interest. In some examples, the region of interest model generator 226 can be programmed to generate the region of interest model 228 to enable an overlay of the one or more isolated regions of interest or a portion of the one or more isolated regions of interest in response to a user input via the user interface 216.

In an example where the one or more regions of interest are to provide a further reference frame, which may be selectively added or removed from an output visualization (e.g., through the user input device 206), the region of interest model generator 226 can be programmed to generate the region of interest model 228 as a 3-D model of points (e.g., pixels or voxels) corresponding to the one or more isolated regions of interest provided by the region of interest method 224. For example, the region of interest model generator 226 can be programmed to generate the region of interest model 228 by taking a voxel dataset corresponding to the voxels representing the one or more isolated regions (e.g., the output of the region of interest method 224) and applying a marching cubes algorithm to generate a mesh of polygons (e.g., triangles). The region of interest model 228 can be stored in the memory 204.

In some examples, the region of interest model generator 226 can be programmed to provide a point cloud representation of the anatomic structure and correspondingly the one or more isolated regions and identify transitions (e.g., a boundary) between the one or more regions of interest and other regions of the anatomic structure based on HU values associated with cloud points representing the anatomic structure. Thus, in some examples, the region of interest model generator 226 can be programmed to identify transitions between the one or more regions of interest and other regions of the anatomic structure based on a type of material. The point cloud can identify boundaries between different material types based on a density. In some examples, a HU value (or range) of blood (with contrast) may overlap with the one or more regions such as soft plaques, such that it may be difficult to identify the voxels (or pixels) that represent the one or more regions of interest. In the present disclosure, a second set of image data from another modality can be employed to identify the voxels that overlap in density with the blood, or other materials to facilitate identification of the one or more regions of interest. The image volume data 212 can include a first set of one or more 3-D medical image volumes and a second set of one or more 3-D medical image volumes acquired preoperatively for the given patient by an imaging modality (e.g., via a CT scan). The first set of 3-D medical image volumes can be acquired preoperatively for the patient before the patient has been administered the contrasting agent. The contrasting agent can mix with the blood to enhance a detectability of the blood within the region of interest via the imaging modality. The second set of one or more 3-D medical image volumes can be acquired preoperatively after the patient has been administered the contrasting agent.

The segmentation method 218 can be programmed to segment the first set of the one or more 3-D medical image volumes and the second set of the one or more 3-D medical image volumes to isolate the anatomic structure in each respective medical image volume set according to the functions described herein. The segmentation method 218 can be programmed to provide first segmented image volume data for the anatomic structure and second segmented image volume data for the anatomic structure. The region of interest method 224 can be programmed to evaluate each segmented image volume data for the anatomic structure to detect the contrasting agent and thus the blood within the anatomic structure. The region of interest method 224 can be programmed to subtract the first segmented image volume data from the second segmented image volume data to isolate (or identify) voxels representing an image volume in the second segmented image for the contrasting agent within the anatomic structure. In some examples, the region of interest method 224 can be programmed to compare the first segmented image volume data and the second segmented image volume data for the anatomic structure to identify differences in image volumes between the first and second segmented image volume data (e.g., identify the voxels representing an image volume in the second segmented image data for the contrasting agent within the anatomic structure).

The region of interest method 224 can be programmed to search, e.g., radially outward, from a centerline computed for the anatomic structure based on the first segmented image volume data to identify one or more regions of interest of the anatomic structure. The region of interest method 224 can be programmed to detect the surface of the one or more identified regions of interest of the anatomic structure based on HU values associated with voxels representing the first segmented image volume data for the anatomic structure and further based on the isolated image volume in the second segmented image for the anatomic structure representative of the contrasting agent. The region of interest method 224 can be programmed to remove an image volume in the first segmented image for the anatomic structure representative of the blood based on the isolated image volume in the second segmented image for the anatomic structure representative of the contrasting agent. The region of interest method 224 can be programmed to provide a filtered first segmented image for the anatomic structure that can be substantially free of voxels representing an image volume for the contrasting agent.

The region of interest method 224 can be programmed to detect the surface of the one or more regions of interest of the anatomic structure by evaluating HU values associated with voxels representing the filtered segmented image volume data for the anatomic structure relative to the HU threshold. The region of interest model generator 226 can be programmed to generate the region of interest model 228 based on the one or more identified regions. In some examples, the anatomic model generator 220 can be programmed to generate the anatomic model based on the filtered segmented image volume data for the anatomic structure. In some examples, the region of interest model 228 can be used to help plan a corresponding procedure (e.g., surgical procedure) as well as be displayed, e.g., relative to the anatomic model, during the corresponding procedure, for example, while using a tracking system to facilitate intraoperative positioning and guidance of an object relative to a patient. In some examples, the tracking system can correspond to a tracking system as described in the above-incorporated '300 patent application. In other examples, different tracking system can be used.

The region of interest model 228 can be spatially registered with the anatomic model and employed during a corresponding procedure to assist a clinician (e.g., a doctor) in visualizing and navigating the anatomic structure by providing the clinician with real-time awareness of the one or more regions of interest (e.g., calcification regions, etc.). The registration of the region of interest model 228 can be facilitated in an example where the anatomic model is derived from the same image data (e.g., CT image data). Color coding, shading, or other indicia can be utilized to differentiate between the region of interest model and the anatomic model as well as to specify a type of plaque or other characteristic of the tissue in the region of interest model. Additionally, the graphical rendering based on the region of interest model 228 can be added or removed with respect to the anatomic model (or other underlying image) in response to a user input at the user input device 206. For example, where the region of interest corresponds to calcified tissue within the or on a vessel wall, a user input can be provided to toggle (e.g., turn on and/or off) and thereby control the output generator 214 to selectively render or not render the calcified tissue on the display provided by the output device 208.

In some examples, the region of interest model 228 for the region of interest can be combined with a model of anatomic structure to provide an output visualization. For example, an output generator is configured to utilize a calcification model (e.g., the region of interest model 228) in combination with anatomic structure modeling data to provide aggregate output visualization data for rendering a graphical output on a display. In some examples, the output generator can correspond to an output generator 302 as described in the '300 patent application. In these examples, the output generator 302 can be configured to utilize the calcification model in combination with model data 308 and 309 to provide corresponding output visualization data 304 for rendering on the display.

Figure 3:
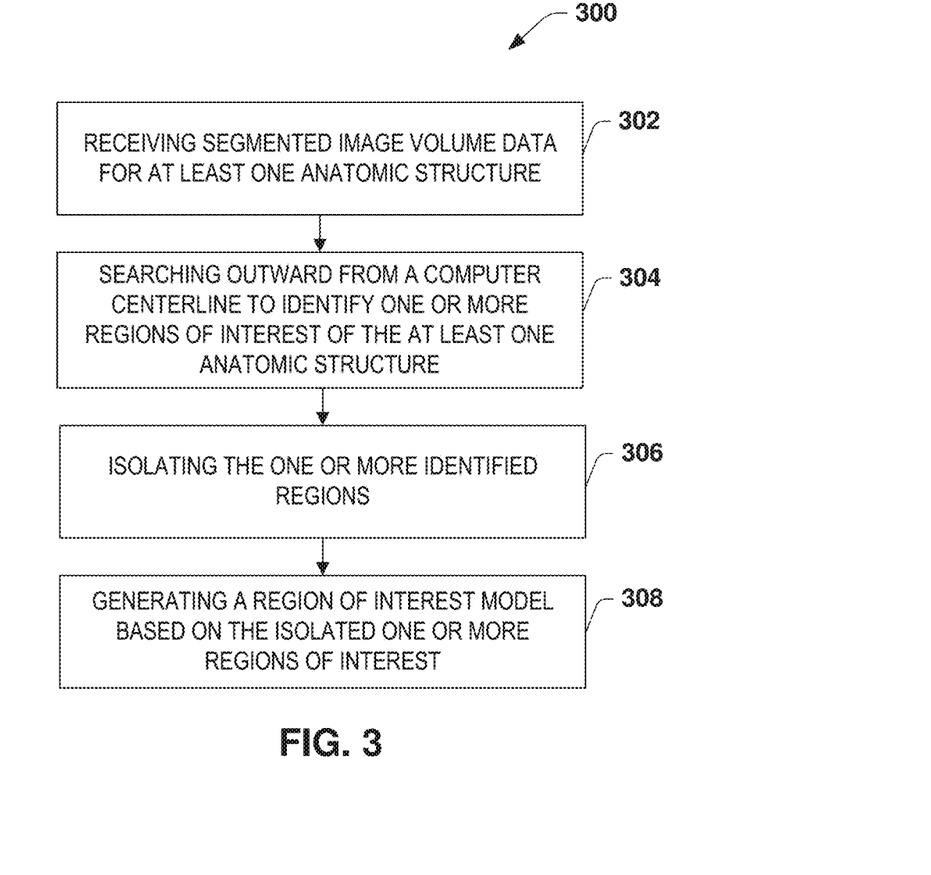
FIG. 3 is a flow diagram depicting an example of a method for generating a region of interest model.

In view of the foregoing structural and functional features described above, an example method will be better appreciated with reference to FIG. 3. While, for purposes of simplicity of explanation, the example method of FIG. 3 is shown and described as executing serially, it is to be understood and appreciated that the present example is not limited by the illustrated order, as some actions could in other examples occur in different orders, multiple times and/or concurrently from that shown and described herein.

FIG. 3 depicts an example of a method 300 for generating a region of interest model (e.g., the region of interest model 110, as illustrated in FIG. 1 or the region of interest model 228). In some examples, the method 300 can be implemented by a modeling engine (e.g., the region of interest modeling engine 106, as illustrated in FIG. 1) or a computer system (e.g., the computer system 200, as illustrated in FIG. 2).

The method can begin at 302, by receiving (e.g., at the region of interest modeling engine 106 or the region of interest method 224) segmented image volume data for at least one anatomic structure. The segmented image volume data can include a 3-D image volume that includes the at least one anatomic structure. At 304, the method includes searching (e.g., by the region of interest modeling engine 106 or the region of interest method 224) outward from a computed centerline for the at least one anatomic structure to detect a surface of one or more regions of interest of the at least one anatomic structure. The surface of the one or more regions of interest can be detected by evaluating values (e.g., HU values) associated with voxels representing the 3-D image volume for the at least one anatomic structure located radially from the computed centerline relative to a value threshold. In some examples, the one or more regions of interest can correspond to one or more regions at which at least calcium has deposited and hardened. At 306, the one or more regions of interest of the at least one anatomic structure are isolated in response to the searching. For example, the region of interest modeling engine 106 or the region of interest method 224 can be configured to isolate the one or more regions of interest of the at least one anatomic structure. At 308, a region of interest model (e.g., the region of interest model 110 or the region of interest model 228) is generated based on the one or more isolated regions of interest. The region of interest model can be generated by the region of interest modeling engine 106 or the region of interest method 224.

Figure 4:
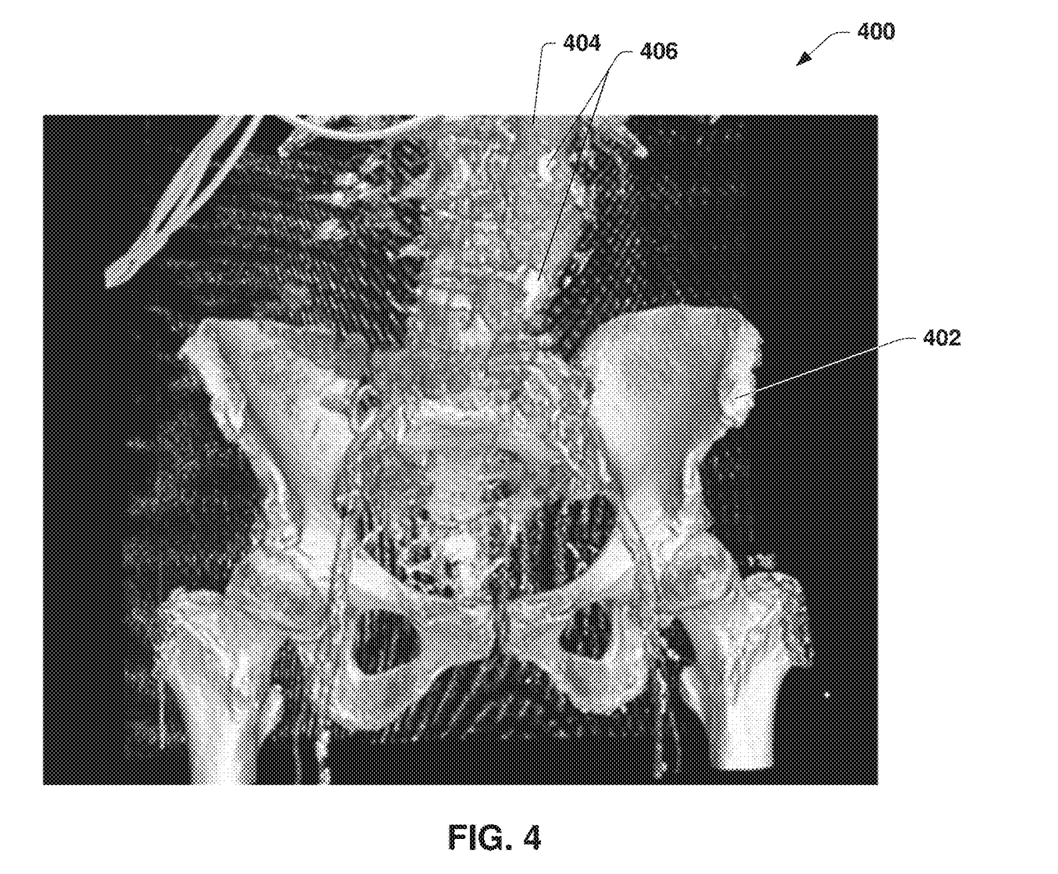
FIG. 4 depicts an example of a segmented image that includes bone and an anatomic structure.

FIG. 4 depicts an example of a segmented image 400 that includes a bone 402, an anatomic structure (e.g., vessels) 404 and calcification 406. The segmented image 400 can be provided by a computer system (e.g., the computer system 200, as illustrated in FIG. 2). For example, the segmented image 400 can be rendered from separate image volumes for the segmented vessel 404 (e.g., generated by the segmentation method 218, as illustrated in FIG. 2), and the segmented bone 402 (e.g., generated by the segmentation method 218, as illustrated in FIG. 2).

Figure 5:
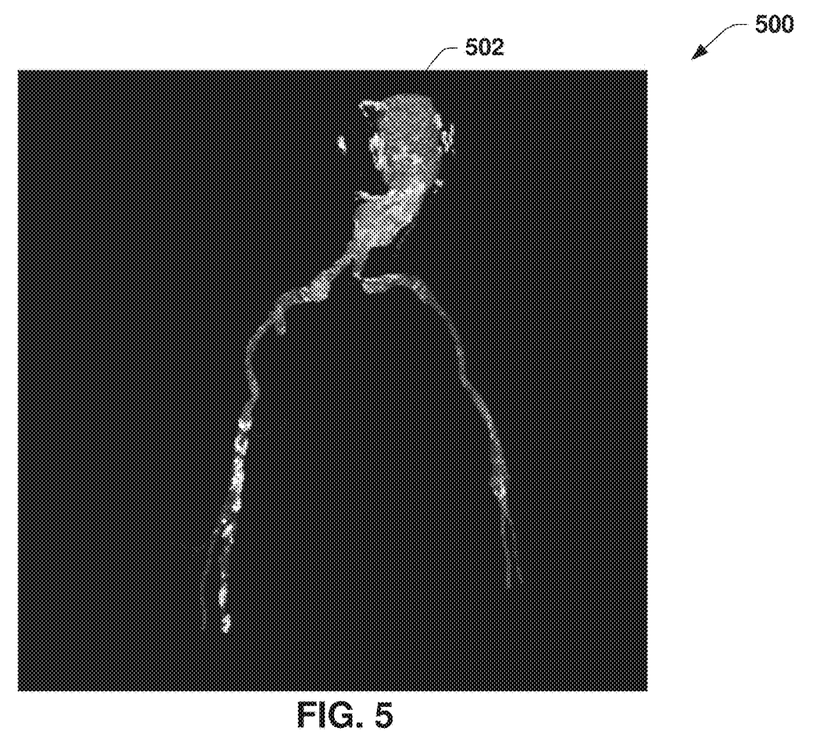
FIG. 5 depicts an example of a graphical representation of an anatomic structure.

FIG. 5 depicts an example of a graphical representation 500 of an anatomic structure, such as a vessel 502. The graphical representation 500 can be provided by a computer system (e.g., the computer system 200, as illustrated in FIG. 2) and rendered on a display (e.g., the output device 208, as illustrated in FIG. 2). By way of example, as illustrated in FIG. 5, the vessel 502 is an aorta. The graphical representation 500 of the vessel 502 can be rendered from a segmentation volume for the isolated vessel (e.g., generated by the segmentation method 218, as illustrated in FIG. 2).

Figure 6:
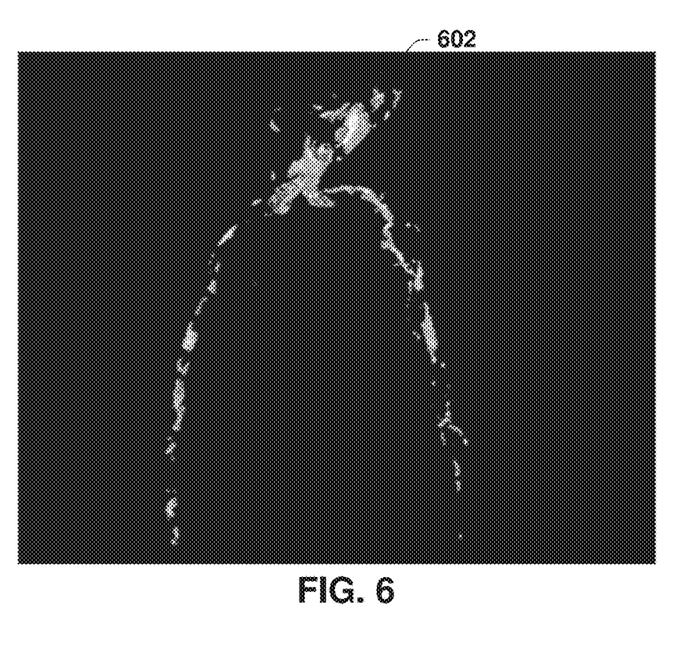
FIG. 6 depicts an example of a graphical representation of a calcification model.

FIG. 6 depicts an example of a graphical representation 600 of a calcification model (e.g., the vessel model 502). The graphical representation 600 can be provided by a computer system (e.g., the computer system 200, as illustrated in FIG. 2) and rendered on a display (e.g., the output device 208, as illustrated in FIG. 2). In some examples, the calcification model can correspond to the region of interest model 228, as illustrated in FIG. 2. For example, the graphical representation 600 of the calcification model can be rendered from a segmentation volume for the one or more isolated regions (e.g., generated by the region of interest method 224, as illustrated in FIG. 2).

FIG. 7 depicts an example of a graphical user interface 700 demonstrating a calcification model overlaying an anatomic model. The graphical user interface 700 can be generated by a computer system, such as the computing system 200, as illustrated in FIG. 2. The visualization of the calcification model with respect to the graphical user interface 700 can be selectively toggled on and off in response to a user input, such as received at an input device (e.g., the user input device 206, as illustrated in FIG. 2), as described herein.

FIG. 8 depicts an example of another graphical user interface 800 demonstrating a calcification model overlaying an anatomic model. The graphical user interface 800 can be generated by a computer system, such as the computing system 200, as illustrated in FIG. 2. The visualization of the calcification model with respect to the graphical user interface 800 can be selectively toggled on and off in response to a user input, such as received at an input device (e.g., the user input device 206, as illustrated in FIG. 2).

In view of the foregoing structural and functional description, those skilled in the art will appreciate that portions of the systems and method disclosed herein may be embodied as a method, data processing system, or computer program product such as a non-transitory computer readable medium. Accordingly, these portions of the approach disclosed herein may take the form of an entirely hardware embodiment, an entirely software embodiment (e.g., in one or more non-transitory machine-readable media), or an embodiment combining software and hardware. Furthermore, portions of the systems and method disclosed herein may be a computer program product on a computer-usable storage medium having computer readable program code on the medium. Any suitable computer-readable medium may be utilized including, but not limited to, static and dynamic storage devices, hard disks, optical storage devices, and magnetic storage devices.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processor of a general-purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

What have been described above are examples. It is, of course, not possible to describe every conceivable combination of components or methods, as further combinations and permutations are possible. Accordingly, the invention is intended to embrace all such alterations, modifications, and variations that fall within the scope of this application, including the appended claims. Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, the term "including" means including but not limited to. The term "based on" means based at least in part on.

What is claimed is:

1. A system comprising:
a non-transitory computer-readable medium configured to store data and instructions;
a processor configured to access the non-transitory computer-readable medium and execute the instructions, the instructions comprising:
region of interest method code programmed to:
receive segmented image volume data for at least one anatomic structure, wherein the segmented image volume data includes a first set of segmented image volume data that includes the at least one anatomic structure and a second set of segmented image volume data that includes the at least one anatomic structure;
subtract the first set of segmented image volume data from the second set of segmented image volume data to identify image volumes in the second set of segmented image volume data representing at least a contrasting agent within the at least one anatomic structure;
search outward from a computed centerline for the at least one anatomic structure, wherein the search outward from the computed centerline comprises:
implementing a first evaluation of the first set of segmented image volume data to identify one or more portions of the anatomic structure that has a thickness that is equal to or greater than a thickness threshold;
implementing a second evaluation of the first set of segmented image volume data to detect a surface of one or more regions of interest of the at least one anatomic structure based on the identified one or more portions of the anatomic structure, based on an evaluation of values associated with voxels representing the first set of segmented image volume data and based on the identified image volumes in the second set of segmented image volume data, wherein the one or more regions of interest are part of at least one of the identified one or more portions of the at least one anatomic structure; and
generate a region of interest model based on the one or more identified regions of interest.

2. The system of claim 1, wherein the region of interest method code is further programmed to apply a marching cubes algorithm to a voxel dataset for the one or more identified regions of interest of the at least one anatomic structure to generate the region of interest model.

3. The system of claim 1, wherein the instructions further comprise a segmentation method code programmed to receive image volume data comprising a first set of one or more 3-D image volumes of a patient region of a given patient, and a second set of one or more 3-D image volumes of the patient region.

4. The system of claim 3, wherein the segmentation method code is further programmed to segment the first set of the one or more 3-D image volumes and the second set of the one or more 3-D image volumes to isolate the at least one anatomic structure in each set of the one or more 3-D image volumes.

5. The system of claim 4, wherein the region of interest method code programmed to isolate comprises providing the first set of segmented image volume data for the at least one anatomic structure from the first set of the one or more 3-D image volumes and the second set of segmented image volume data for at least one anatomic structure from the second set of the one or more 3-D image volumes.

6. The system of claim 5, wherein the image volumes identified in the second set of image volume data comprise respective 3-D image volumes.

7. The system of claim 6, wherein the region of interest method code is further programmed to exclude 3-D image volumes in the first set of segmented image volume data for the at least one anatomic structure based on the identified 3-D image volumes in the second set of segmented image volume data during the search to detect the surface of the one or more regions of interest.

8. The system of claim 6, wherein the region of interest method code is further programmed to exclude 3-D image volumes in the first set of segmented image volume data for the at least one anatomic structure based on the identified 3-D image volumes in the second set of segmented image volume data to provide filtered segmented image volume data.

9. The system of claim 8, wherein the surface of the one or more regions of interest is detected by evaluating the values associated with the voxels representing the 3-D image volume of the filtered segmented image volume data relative to a threshold.

10. The system of claim 9, wherein the first set of the one or more 3-D image volumes of the patient region was acquired before the patient had been administered a contrasting agent, and the second set of the one or more 3-D image volumes of the patient region where acquired after the patient had been administered the contrasting agent.

11. The system of claim 10, wherein the region of interest model corresponds to a calcification model.

12. The system of claim 1, wherein the instructions further comprise an anatomic model generator programmed to generate model data for a geometry of the at least one anatomic structure based on the segmented image volume data.

13. The system of claim 12, wherein the instructions further comprise an output generator programmed to render on a display the region of interest model and an anatomic model, the anatomic model being generated based on the model data.

14. The system of claim of claim 13, wherein the output generator is programmed to render on the display the region of interest model overlaying the anatomic model.

15. The system of claim 14, wherein the output generator is further programmed to selectively render or not render the region of interest model with respect to the anatomic model on the display based on a user input at an input device.

16. The system of claim 13, wherein the one or more regions of interest are one or more abnormal regions of interest, the one or more abnormal regions of interest comprise one of a calcified region, a mineralized region, and a plaque region, and the output generator is programmed to render the region of interest model on the display with a given color or shading based on a type of abnormal region of interest.

17. A computer-implemented method comprising:
receiving segmented image volume data for at least one anatomic structure, wherein the segmented image volume data includes a three-dimensional (3-D) image volume that includes the at least one anatomic structure;
searching outward from a computed centerline for the at least one anatomic structure, the searching outward from the computed centerline comprising:
implementing a first evaluation of the segmented image volume data to identify one or more portions of the at least one anatomic structure that has a thickness that is equal to or greater than a thickness threshold;
implementing a second evaluation of the segmented image volume data based on the identified one or more portions of the at least one anatomic structure to detect transitions between an abnormal region of interest and a respective other portion of the at least one anatomic structure based on an evaluation of values of voxels representing the 3-D image volume that includes the at least one anatomic structure, wherein a first detected transition corresponds to a location on a surface of the abnormal region of interest and a second detected transition corresponds to a location on a surface of the respective portion, and wherein the abnormal region of interest comprises one of a calcified region, mineralized region, and plaque region, wherein the abnormal region of interest is part of at least one of the identified one or more portions of the at least one anatomic structure;
isolating the abnormal region of interest of the at least one anatomic structure in response to the searching; and
generating a region of interest model based on the abnormal region of interest.

18. The computer-implemented method of claim 17, wherein the values correspond to Hounsfield unit (HU) values, wherein the evaluating comprises comparing each HU value associated with each voxel for the at least one anatomic structure to a HU threshold to detect the transitions.

19. The computer-implemented method of claim 17, wherein each value is a gradient vector value, the evaluating comprises evaluating each gradient vector value associated with each voxel for the at least one anatomic structure to a gradient threshold to detect the transitions.

20. The computer-implemented method of claim 19, wherein the isolating comprises excluding 3-D image volumes for the identified regions of interest from the segmented image volume data for the at least one anatomic structure, wherein the region of interest model is generated based on the excluded 3-D image volumes.

21. The computer-implemented method of claim 17, wherein the generating comprises applying a marching cubes algorithm to a voxel dataset for the isolated abnormal region of interest of the at least one anatomic structure to generate the region of interest model.

22. The computer-implemented method of claim 17, wherein the values of the voxels representing the 3-D image volume include speckle noise values, which are evaluated during the searching to detect the transitions between the abnormal region of interest and the respective other portion of the at least one anatomic structure.

23. A system comprising:
- a non-transitory computer-readable medium configured to store data comprising segmented image volume data for at least one anatomic structure and instructions, the segmented image volume data including a three-dimensional (3-D) image volume that includes the at least one anatomic structure;
- a processor configured to access the non-transitory computer-readable medium and execute the instructions, the instructions comprising a region of interest modeling engine, the region of interest modeling engine being programmed to:
  - search outward from a computed centerline for the at least one anatomic structure, wherein the searching outward from the computed centerline comprising:
    - implementing a first evaluation of the segmented image volume data to identify one or more portions of the at least one anatomic structure that has a thickness that is equal to or greater than a thickness threshold;
    - implementing a second evaluation of the segmented image volume data based on the identified one or more portions of the at least one anatomic structure to detect a surface of one or more regions of interest of the at least one anatomic structure, the surface of the one or more regions of interest being detected based on an evaluation of-Hounsfield unit (HU) values associated with voxels representing the 3-D image volume that includes the at least one anatomic structure relative to a plurality of HU threshold ranges, each HU threshold range being associated with a density of a different material, wherein during the searching a first surface of a first region of interest of the one or more regions of interest is detected based on a first HU threshold range of the plurality of HU threshold ranges, and a second surface of a second region of interest of the one or more regions of interest is detected based on a second HU threshold range of the plurality of HU threshold ranges, the first region of interest having a different material density than the second region of interest, wherein the one or more regions of interest are part of at least one of the identified one or more portions of the at least one anatomic structure;
  - isolate the first region of interest of the one or more regions of interest of the at least one anatomic structure in response to the searching by excluding 3-D image volumes for the first region of interest of the one or more regions of interest from the segmented image volume data for the at least one anatomic structure; and
  - generate a region of interest model by applying a marching cubes algorithm to a voxel dataset for the first region of interest of the one or more regions of interest of the at least one anatomic structure.

\* \* \* \* \*